INVENTORS
DONALD L. LOGERWELL
JAMES P. TIPTON

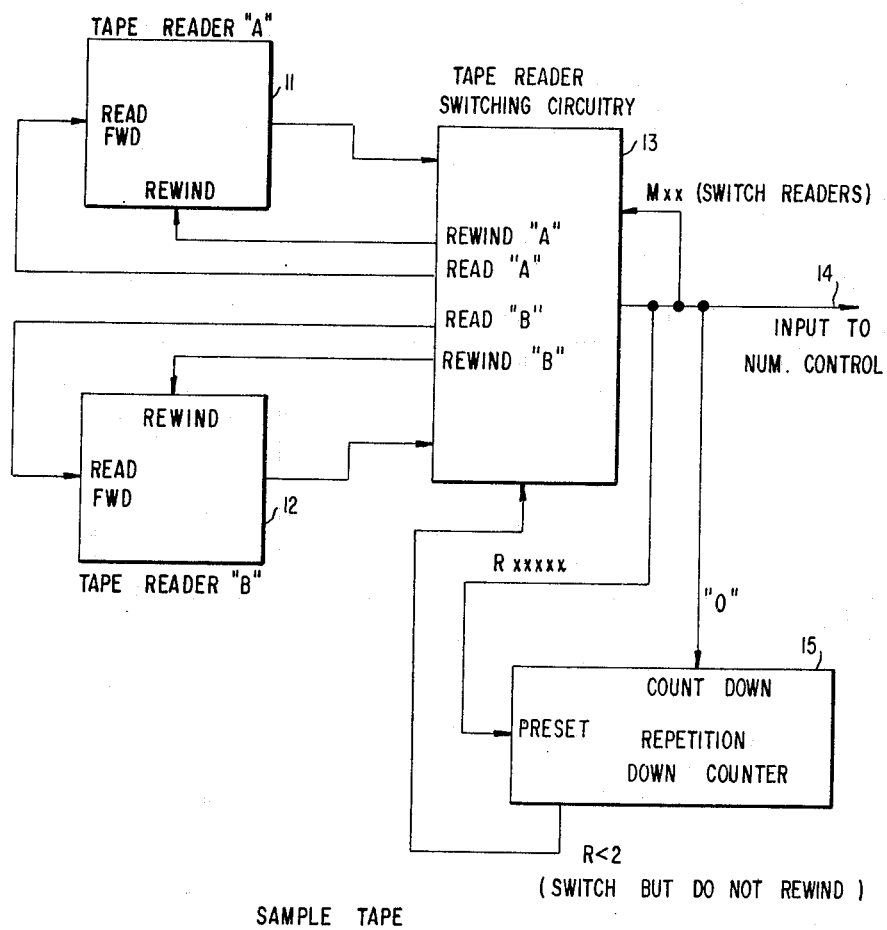

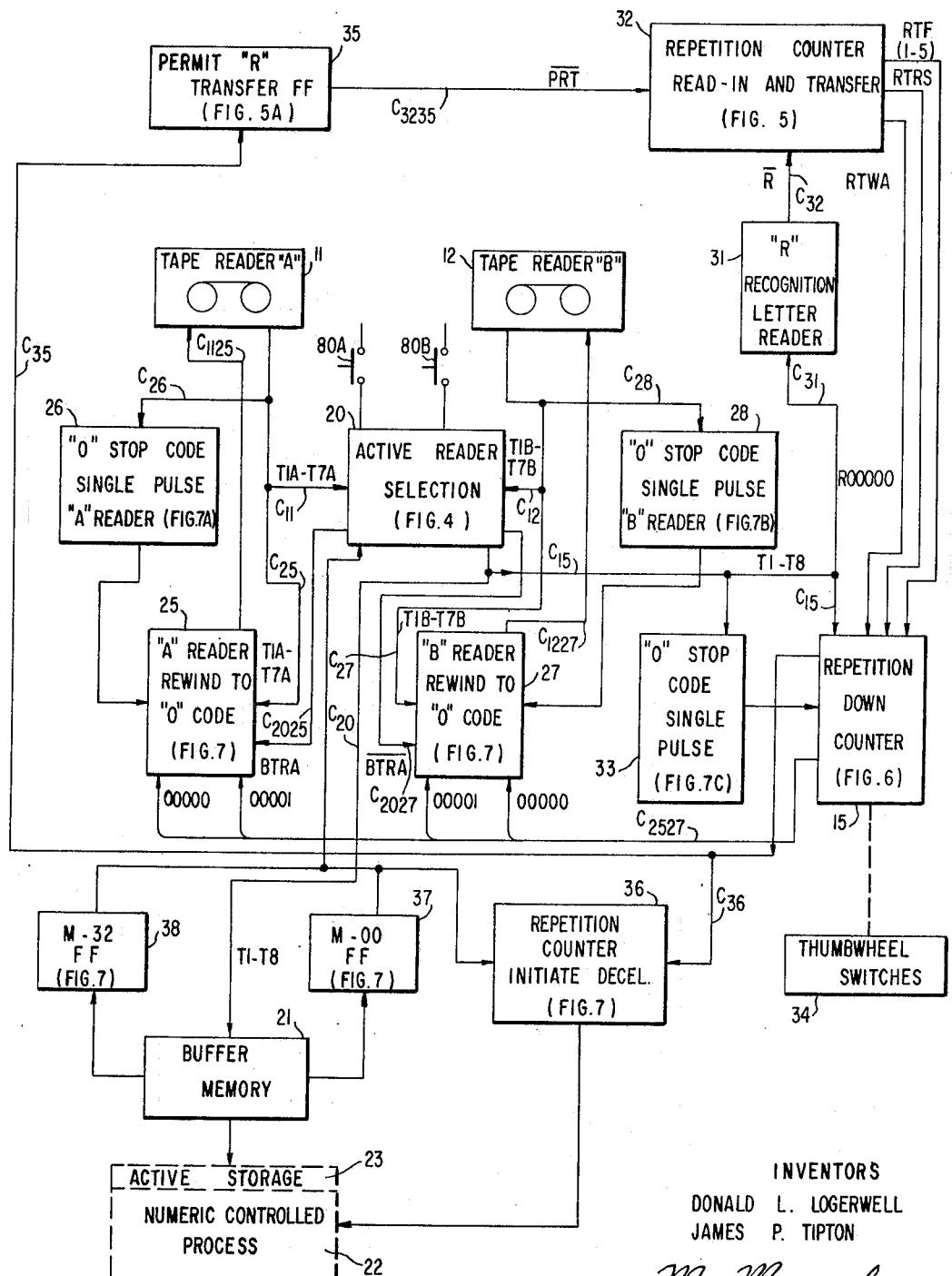

*M. Masnik*

BY ATTORNEY

Dec. 23, 1969   D. L. LOGERWELL ET AL   3,486,005
DUAL READER CONTROL METHOD AND APPARATUS
Filed Oct. 13, 1966                         5 Sheets-Sheet 4
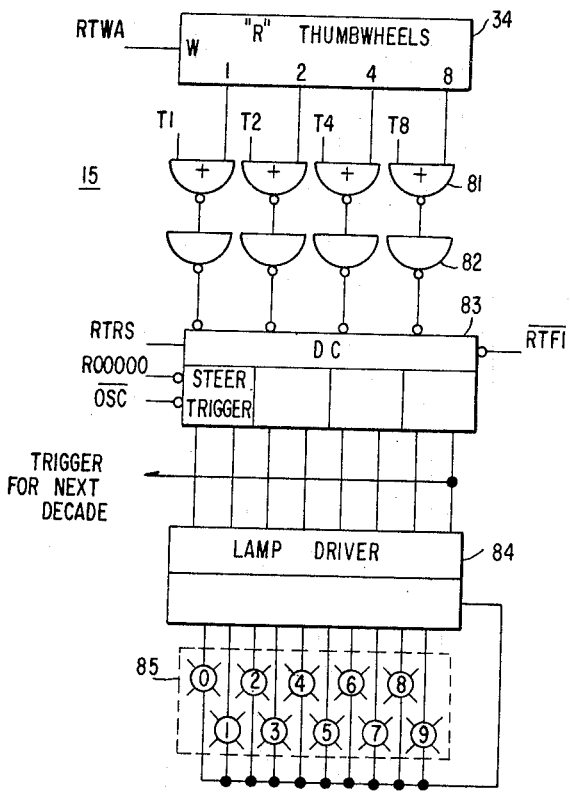
FIG.6
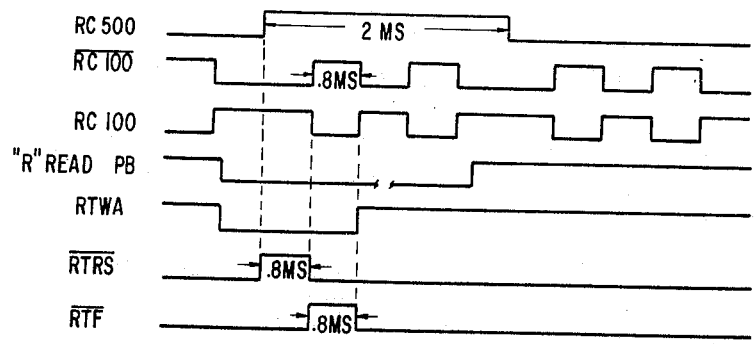
FIG.8   "R" READ IN CYCLE
INVENTORS
DONALD L. LOGERWELL
JAMES P. TIPTON
BY   *M. Masnik*
ATTORNEY Dec. 23, 1969  D. L. LOGERWELL ET AL  3,486,005

DUAL READER CONTROL METHOD AND APPARATUS

Filed Oct. 13, 1966

INVENTORS
DONALD L. LOGERWELL
JAMES P. TIPTON

BY *M. Masnik*

ATTORNEY

United States Patent Office 3,486,005
Patented Dec. 23, 1969

3,486,005
DUAL READER CONTROL METHOD AND APPARATUS
Donald Lyle Logerwell, Alexandria, and James Phillips Tipton, Waynesboro, Va., assignors to General Electric Company, a corporation of New York
Filed Oct. 13, 1966, Ser. No. 586,555
Int. Cl. G06k 7/00
U.S. Cl. 235—61.6                                16 Claims

ABSTRACT OF THE DISCLOSURE

Multiple reader arrangement for automatic alpha-numeric control of a process or machine using machine read, prestored instruction programs which contain repetitive portions, one reader rewinding while another reads and with a repetition counter control.

---

This invention relates to automatic alpha-numeric control methods and apparatus.

More specifically, the invention relates to a new and improved dual reader repetition control method and apparatus for performing automatic alpha-numeric control of a process or machine with machine read, prestored instruction programs which contain repetitive portions.

Prestored program control of automatic machine tools, processes, etc. is coming into wide spread use throughout a number of industries. Many of the known systems for performing such prestored program automatic control employ such devices as magnetic tape readers, punched tape readers, punched card readers, etc. for reading the prestored program of instructions, and thereafter supplying directive control signals to the remainder of the system in order to carry out the instructions. In such systems it is often necessary to repeat a directed operation a number of times. For example, in the manufacture of pressure vessels, etc. by winding with fiberglass or metallic filaments it is necessary to wind onto a supporting core structure such as a collapsible mandrel with a filamentary material with the same, or even alternately but regularly different, winding patterns which must be repeated a number of times. In some instances such patterns are repeated as many as 500, 1,000 or as many repetitions as are required.

It is believed apparent from the above discussion that if the instruction for a similar pattern to be repeated a number of times in the production of a given article, are individually recorded on magnetic tape, punched tape, etc. for each instance in which it is to be repeated, that the physical volume of tape, cards, etc. required to carry the instructions becomes almost prohibitive. To overcome this problem the present invention was devised.

It is therefore a primary object of the present invention to provide a new and improved dual reader repetition control method and apparatus for performing automatic alpha-numeric control of a process or machine with machine read, prestored instruction programs which contain repetitive portions.

Another object of the invention is to provide such a dual reader repetition control method and apparatus which greatly reduces the volume of instructions required to continuously perform repeated automatically controlled operations.

In practicing the invention a method of controlling a prestored program run alpha-numeric controlled process with a prestored program having repetitive portions, is provided, and uses at least two prestored program reading means. The method is performed by selecting one of the program reading means to be the active program reader and controlling the process in accordance with the output of this active program reading means, and thereafter switching to the other of the program reading means upon completion of each repetitive portion of the prestored program. The method further envisions concurrently returning the previously active reading means through at least the repetitive portion of the prestored program along with switching to the other of the program reading means upon completion of each repetitive portion of the prestored program. As a result one of the reading means is always conditioned to repeat the repetitive portion of the program upon completion of such repetitive portion by the other reading means for a desired number of repeats. The method further includes discontinuing the return of the alternate inactive reading means to the start of the repetitive portion of the prestored program upon completion of a predirected number of repeats whereby the reading means are conditioned to complete subsequent portions of the prestored program.

In carrying out the above described method, a prestored program alpha-numerically controlled apparatus is provided which comprises at least two program reading means each having a copy of the prestored program of operations to be conducted including the repetitive portions thereof. Active reader selection means are provided which are operatively coupled to the reading means and to the alpha-numerically controlled apparatus for alternately selecting and rendering active one of the reading means for supplying its output to control the apparatus. Rewind means are operatively coupled to each of the reading means and to the active reader selection means and controlled thereby for automatically returning the active reading means to the start of the repetitive portion of the operation upon reaching the end of such repetitive portion. The apparatus is completed by means for automatically switching the active reader selection means to the alternate reading means to render it active upon the prevoiusly active reading means reaching the end of the repetitive portion of the operation and to initiate rewind of the previously active reading means by the rewind means.

The above described apparatus may be further modified in a manner such that the means for automatically switching the active reader selection means includes finish repeat recognition means for recognizing an end of repetitive operation code in the prestored program. This finish repeat recognition means is operatively coupled to the output from the active reading means and to the active reader selection means for actuating the active reader selection means at the end of each repetitive operation. This causes the active reader selection means to select the alternate one of the reading means and to render it active and to initiate rewind of the previously active reading means.

The apparatus according to the invention also preferably includes counting means, means for presetting the counting means at the start of the prestored program to a desired number of repetitive operations to be conducted and means controlled by the counting means for inactivating the rewind means upon completion of the desired number of repetitive operations. As a result of the inclusion of these elements, at least one of the reading means is conditioned to complete the remainder of the prestored program upon completion of all of the repetitive operations.

It is also preferred that an apparatus according to the invention further include start of repetitive pattern recognition means for recognizing a start of repetitive operation code in the prestored program. This start of repetitive pattern recognition means is operatively coupled to the reading means and to the counting means for adjusting the count in the counting means during each repetitive operation.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a functional block diagram of a new and improved dual reader repetition control apparatus capable of performing the novel method of control in accordance with the present invention, FIGURE 2 is a diagrammatic sketch of a magnetic or punched tape format suitable for use in practicing the invention;

FIGURE 3 is a more detailed functional block diagram of an overall dual reader repetition control apparatus constructed in accordance with the teachings of the present invention;

FIGURE 6 is a schematic logical circuit diagram of the repetition down counter comprising a part of the apparatus shown in FIGURE 3;

FIGURE 8 is a series of voltage versus time operating characteristic curves which serve to illustrate the operation of the apparatus shown in FIGURE 3.

OVERALL DUAL READER APPARATUS

Figure 4:
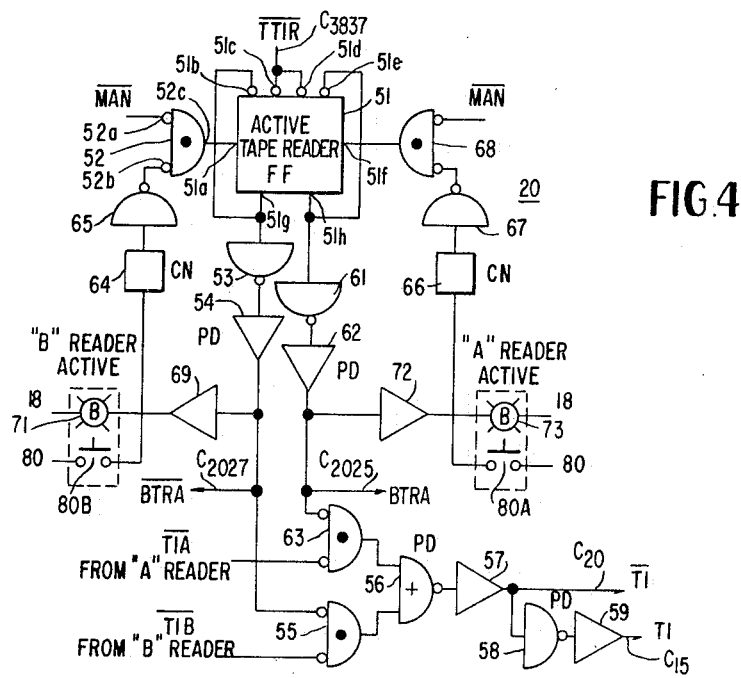
FIGURE 4 is a detailed logical circuit diagram illustrating the construction of the active reader selection circuit portion of the apparatus shown in FIGURE 3.

FIGURE 1 of the drawings is a functional block diagram illustrating broadly the basic components of a new and improved dual reader repetition control apparatus for performing automatic alpha-numeric control of the process or machine with machine read, prestored instruction programs which contain repetitive portions. The apparatus shown in FIGURE 1 is comprised by first and second reading means 11 and 12 which can constitute punched tape readers. While punched tape readers are described, the invention will operate equally well with magnetic tape readers, punched cards, etc. which are susceptible to being machine read. The reading means 11 and 12 are provided with identical copies of alpha-numeric coded punched tape for performing a desired operation wherein the operation itself includes a number of repetitive portions with each repetitive portion being identical to the other, or substantially identical. While the tapes being read by the first and second means 11 and 12 are described as identical, such arrangement is preferred from the standpoint of economy because identical copies are easy to make once an original is possessed. However, one of the two reading means could be provided with only a copy of the repetitive portion of the operation, and still obtain satisfactory results with very little modification. It is necessary however, that each of the reading means be provided with its own copy of the repetitive portion of the prestored program. For example, one reading means could be supplied with one part of a repeated pattern while the other was supplied with a complementary part of the pattern whereby alternate running of both patterns operates to repeat the entire pattern. Also slight changes between successively repeated patterns wherein, for example, after each repeat there may be a slight precession, etc., of the machine tool or the like being controlled, can be accommodated with the present arrangement.

Each of the reading means 11 and 12 supply their output through tape reader switching circuitry 13 to the input 14 of a numerical controlled apparatus (not shown). The output from the tape reader switching circuitry 13 is also supplied to preset the repetition down counter shown at 15. Repetition down counter 15 functions to control operation of the tape reader switching circuitry 13 which in turn operates to selectively control operation of the first and second reading means 11 and 12 as will be described more fully hereinafter.

The format of a magnetic or punched tape used with the first and second tape reading means 11 and 12, is illustrated in FIGURE 2. As shown in FIGURE 2 the tape of instructions is comprised by a first block which includes a coded "R" instructions signal indicating the number of repetitions to be performed by the controlled apparatus. Following this first block is a second block containing a start of repetitive pattern recognition code (identified as the letter "O". Following this second block there comes the repetitive pattern which is to be repeated for the predetermined number of times identified in the "R" instructions set out in block number 1. Following the pattern block is a last block which contains the end of repetitive pattern coded signal (identified as M-32) which indicates to the reader that the end of the pattern to be repeated has been reached. If there are further non-repetitive operations to be formed by the prestored program, these will follow the last block as a remainder and will be read out by either the first or second reading means upon completion of all of the predirected number of repetitive operations carried out in connection with the pattern identified in block number 3.

Assuming that both tape reading means 11 and 12 are supplied with identical tapes such as shown in FIGURE 2, then one of the readers, assumed to be reading means 11, begins reading and in the first block of FIGURE 2 will read the number of times that the pattern is to be repeated. This direction is coded with the address letter R and is supplied to the repetition down counter 15 to set the counter to the desired number of repetitions. Reading means 11 then reads the start of pattern recognition code "O" and supplies a down count signal pulse to the repetition down counter 15 to cause the counter to count down by one count. Thereafter the first reading means 11 reads through the pattern in block 3 and supplies pattern controlling signals through the output terminal 14 to the input of the numerically controlled apparatus or process being performed. At he end of the pattern in block 3, the first reading means 11 will read the M code which will indicate the end of the repetitive pattern and develop an "M" code signal that is supplied to the tape reader switching circuitry 13. This signals the tape reader switching circuitry 13 to switch to the second reading means 12, and to concurrently rewind the first reading means 11. Control is thereby switched to the second reading means 12 which then operates in the same fashion as the first. In the interim the first reading means 11 will rewind until it passes the "O" start of repetitive pattern code and then stops in preparation to reassume control.

The reading means 11 and 12 continue to alternate in the above-described fashion until the repetition down counter 15 signals that there are less than two repetitions remaining. Upon this occurrence, the "M" end of repetitive pattern identifying code will be used to switch the reading means 11 and 12, but they are not rewound. Thus, at the end of the reading of the last repetitive pattern to be performed, both reading means 11 and 12 will be ready to continue to read any subsequent or remaining instructions that are to be read out, and are supplied as input controlling signals to the numerically controlled apparatus or process through terminal 14.

The new and improved dual reader repetition control method and apparatus described briefly above drastically reduces the physical amount of recording medium such as magnetic tape, punched tape, punch cards, etc. required to perform a given repetitive operation without the necessity of auxiliary storage media such as a magnetic memory. It has the advantage of a stored program approach without the expense and complexity of address and retrieval. While it has been explained for use in connection with a filament winder, the apparatus and method have merit in application where any repetition of a series of operations is involved. Further, it has all the advantages of a "canned cycle" but is much more flexible in that there is no time delay involved in introducing the "canned cycle" into control of the operation being performed.

FIGURE 3 is a detailed functional block diagram of a novel dual reader repetition control apparatus according to the invention. In the apparatus shown in FIGURE 3 the first and second reading means 11 and 12 are illustrated as punched tape readers whose outputs are supplied over conductors $C_{11}$ and $C_{12}$, respectively, to respective inputs of an active reader selection means 20. The active reader selection means 20 may be actuated by manually operated push button switches 80A or 80B to thereby connect the output from either the first reading means 11 or second reading means 12 over the output conductor $C_{20}$ to the input of a buffer memory device 21. The buffer memory device 21 may in fact comprise part of a numeric controlled machine tool or other apparatus such as a computer controlled process 22 having an active storage shown at 23. By this arrangement, the active reader selection means 20 functions to switch the output from the first tape reader 11, or alternately the output from the second tape reader 12 to supply control signals over the conductor 20 to buffer memory 21 and thereby control the alpha-numeric controlled apparatus 22.

Rewind of the first tape reader 11 is controlled by a first rewind means comprised by a first reader rewind to "O" code means 25 having the output from first tape reader 11 supplied thereto over conductor $C_{25}$, and having its output supplied over conductor $C_{1125}$ to control rewind of the first tape reader 11. The output from first tape reader 11 is also supplied over a conductor $C_{26}$ to the input of a "O" stop code single pulse reader 26 which functions as a start of repetitive pattern recognition means for recognizing a start of the operation code such as code "O" shown in block 2 of FIGURE 2. The output from the "O" stop code single pulse "A" reader 26 controls the operation of the first rewind means 25. In a similar fashion, the second tape reading means 12 also supplies its output over a conductor $C_{27}$ to the input of a second rewind means 27 that controls rewind of the second tape reader 12. The output of the second tape reader 12 is also supplied over a conductor $C_{28}$ to the input of a second "O" stop code single pulse "B" reader 28 that serves as a start of repetitive pattern recognition means for recognizing the start of repetitive operation code such as the letter "O" shown in block 2 of the tape format illustrated in FIGURE 2. The output signal from the second "O" code reader 28 is then employed to control operation of the second rewind means 27. Each of the readers rewind to "O" code means 25 and 27 are also controlled by R00001 and R00000 signals supplied thereto from the repetition down counter 15 over conductor $C_{2527}$. By reason of the above described arrangement, the active reader selection means 20 will function to select either the first or second reading means 11 or 12 as the active reader, and supply the output thereof to the buffer memory 21. It also initiates rewind of the inactive tape reader which thereafter is controlled by its associated rewind to "O" code and "O" stop code single pulse circuit means.

The output of the active reader is also supplied over a conductor $C_{15}$ to the input of the counting means comprised by the repetition down counter 15, and over a conductor $C_{31}$ to a letter "R" recognition reading means 31. The letter "R" recognition means 31 comprises a preset count instruction recognition means for identifying the preset count "R" instructions in the prestored program such as those illustrated in block 1 of the tape format shown in FIGURE 2. The output from the letter "R" reading means 31 is supplied over a conductor $C_{32}$ to a repetition counter read in and transfer means 32. The repetition counter read in and transfer means 32 has a number of outputs identified as RTF(1–5), RTRS and RTWA which are supplied to the repetition down counter 15 as inputs. These output signals from the repetition counter read in and transfer means function to control operation of the repetition down counter as will be described more fully hereinafter. In addition to the above inputs to the repetition down counter 15, counter 15 is also supplied a count down signal pulse from the output of an "O" stop code signal pulse circuit means 33. The input to the "O" stop code pulse circuit means 33 is supplied from the output of the active reader selection means 20 over the conductor $C_{15}$. Here again it is to be noted that the "O" stop code pulse circuit 33 functions to recognize the occurrence of the letter O in the tape format shown in FIGURE 2, and therefore operates as a start of repetitive pattern recognition means for recognizing a start of the repetitive operation code in the prestored program. The output from the "O" stop code pulse circuit 33 operates to adjust the count in the repetition down counter 15 each time that the active tape reader 11 or 12 reads through the "O" stop code.

In addition to the above mentioned electrical inputs to the repetition down counter 15, counter 15 may also be set manually by a number of manually operable thumbwheel switches shown at 34. The thumbwheel switches 34 are mechanically and electrically connected to the repetition down counter 15 in a manner such that an operator of the equipment can read into or set the repetition down counter 15 for any desired number of repeats of a repetitive portion of the prestored program irrespective of the instructions read into the counter through the "R" letter recognition reader circuit 31 and repetition counter read in and transfer means 32.

One output signal from the repetition down counter 15, identified as the R00000 signal is supplied over a conductor $C_{35}$ to the input of a permit "R" transfer means 35. The output of the permit "R" transfer means 35 is supplied over a conductor $C_{3235}$ to another input of the repetition counter read in and transfer means 32. By this arrangement when the repetition down counter 15 is not empty, that is it has a number of repetitive patterns to be performed registered therein, a lock out signal is derived from the permit "R" transfer means 35 that locks out further transfer of information to the repetition down counter 15 through the repetition counter read in and transfer means 32. This lock out will not prevent adjustment of the count in the repetition down counter 15 by the manually operable thumbwheel switches 34, however.

The R00000 signal is also supplied from the output of repetition down counter 15 over conductor $C_{36}$ to the input of a repetition counter initiate deceleration circuit means 36. The initiate deceleration circuit means 36 functions to control the numeric controlled process 22 directly by starting to slow down operation of the machine tool or other apparatus gradually as will be described more fully hereinafter. In addition to the R00000 input signal, the initiate deceleration circuit means 36 also receives an output signal from a M–00 circuit 37. The M–00 circuit 37 in actuality comprises a means for recognizing the end of the repetitive operations portion of the total prestored program, and in conjunction with R00000 signal functions, to initiate operation of the initiate deceleration circuit means 36. The output from the M–00 circuit means 37 is also supplied back up over a conductor $C_{37}$ to an input of the active reader selection means 20 for controlling this means.

The input to the M–00 circuit means 37 is supplied from the output of the buffer memory 21. In addition the buffer memory 21 also supplies an output signal to a M–32 circuit means 38. The M–32 circuit means 38 operates as a finish of repetitive pattern recognition means for recognizing an end of repetitive pattern code in the prestored program. The output from the M-32 circuit means 38 is coupled to an input of the active reader selection means 20 for actuating this same at the end of each repetitive pattern to cause it to select the alternate one of the reading means 11 or 12 and render it active, and at the same time to initiate rewind of the previously active reading means.

The operation of the system shown in FIGURE 3 is as follows. Assume that both tape readers 11 and 12 are loaded with identical punched tapes having repetitive portions, and that the manually operated push button 80a is depressed. Selection of the first tape reader to be made active can also be achieved electronically automatically with turn-on of the equipment. Closure of push button switch 80a causes the active reader selection means 20 to connect the output from the tape reader 11 to the input of buffer memory 21 which thereafter supplies the active storage 23 of the numeric control process 22 to control the same. The output from the active tape reader 11 is also supplied over the conductor $C_{15}$ to the input of the repetition down counter 15 and to the "R" letter recognition reader 31. Letter reader 31 will function to read the desired number of repetitions to be performed as instructions set forth in block 1 of the tape format shown in FIGURE 2, and operates through the counter read in and transfer means 32 to set the repetition down counter 15 accordingly. As will be explained more fully hereinafter setting of the repetition down counter involves clearing the counter which activates the permit transfer flip flop 35 that then allows the repetition counter read in and transfer to set the repetition counter. Upon the repetition counter being set, the signal fed back to the permit transfer flip flop 35 over conductor $C_{35}$ resets this flip flop so as to thereafter prevent further transfer of instructions into the repetition down counter until it is again emptied.

After completion of reading out the "R" instructions in block 1, the active tape reader 11 will then read the "O" stop code set forth in block 2 of the tape format. Upon this occurrence the "O" stop code single pulse circuit means 33 will pulse the repetition down counter 15 to cause it to count down one count thereby indicating that one performance of the repetitive pattern is being achieved. Thereafter the active tape reader 11 continues to read through the desired pattern set forth in block 3 and supplies binary coded signals representative of the same to the buffer memory 21. Since the buffer memory 21 supplies the active storage of the numeric control process, the pattern will thereafter be performed once by the machine tool or other apparatus being automatically controlled.

Upon completion of reading of the pattern in block 3, the active tape reader 11 will then read the end of pattern recognition code identified as M-32 set out in the last block of the tape format. Upon this occurrence the M-32 circuit means 38 supplies a switching signal to the active reader selection means 20. This results in switching the active reader selection means 20 to cause it to render the second tape reader 12 the active tape reader. Concurrently with this switching action, the first tape reader rewind to "O" code means 25 will be activated by a signal supplied over the conductor $C_{2025}$. As a consequence the first, or previously active, tape reader 11 will rewind itself while the now active tape reader 12 is reading out its tape through the active reader selection means 20 to buffer memory 21. Upon the first tape reader 11 being rewound back to the "O" stop code in block 2 of the tape format, this code serves as a start of repetitive signal which functions to turn off the rewind means 25 and leaves the first tape reader 11 conditioned to again read through the repetitive pattern portion in block 3 of the prestored program.

The second tape reader 12 will then operate in precisely the same manner as described above in connection with the first tape reader 11 to read out its tape into the buffer memory 21. Because the permit transfer flip flop 35 has been reset, as the tape reads through block 1, the information contained in this block will have no effect on the system. However, upon the now active second tape reader 12 reading through the "O" code, it will produce a signal pulse in the "O" stop code circuit means 33 which then will cause the repetition down counter 15 to again count down one count. Upon reaching the end of the repetitive pattern set out in block 3 of the tape format shown in FIGURE 2, the M-32 circuit means 38 will again be activated, and again causes the active reader selection means 20 to switch back to the first tape reader 11 to cause it to become the active tape reader. Concurrently with this action, a start rewind signal $\overline{BTRA}$ is supplied over the conductor $C_{2027}$ to the second tape reader rewind means 27, and causes it to rewind the second tape reader 12 back to the start of the repetitive pattern. Upon the second tape reader 12 being rewound back over the "O" stop code set out in block 2, the "O" stop code circuit means 28 inactivates the second rewind means 27, and as a result the second tape reader 12 is not conditioned to repeat the reading of the repetitive pattern in block 3.

When the last two repetitions are read (one by each of the first and second readers 11 and 12) the tape readers 11 and 12 must be prepared to advance into any further subsequent patterns comprising a part of the prestored program. This is acomplished in the following manner. Assume that the first tape reader 11 begins the next to last repetition in the above described manner. As it reads through the "O" stop code it will count down the repetition down counter 15 to the next to last count identified as R000001. At the end of this next to last repetition, the M-32 flip flop 38 will transfer active control to the second tape reader 12, but it will not function to rewind the first tape reader 11. The reason for this change in manner of operation is that the repetition down counter 15 supplies a R000001 inhibit signal over a conductor $C_{2527}$ to the first reader rewind to "O" code means 25. As a consequence of this inhibit signal, the first tape reader 11 will not be rewound to the beginning of the repetitive pattern but remains at the end of the pattern. Upon the second tape reader number 12 finishing the final repetition, it will operate through the M-32 flip flop 38 to transfer active control to the first tape reader 11. However, the repetition down counter 15 again supplies an R00000 inhibit signal over the conductor $C_{2527}$ to inhibit operation of the second reader rewind to "O" code means 27. Thus the second tape reader 12 similarly is not rewound and hence remains in position at the end of the repetitive pattern to advance into the next or subsequent pattern on the preprogramed tape.

In addition to the above occurrences, it should be noted that the M-00 flip flop 37 is also provided whose output is applied to the repetition counter initiate deceleration circuit means 26 and to the active reader selection means 20. Making a filament wound part in the manner proposed by the present invention normally consists of winding several patterns. When the last pattern is applied to complete the part it is generally necessary to bring the motion of the machine tool used to wind the part to rest after the required number of winding operations have been performed. In order to accomplish this, the machine tool generally includes acceleration and deceleration circuitry which is utilized to bring the winding pattern motions through a slow down to a gradual stop. As set forth above, the program for the last pattern is similar to that of previous patterns except that the M-00 flip flop is activated in place of the M-32 flip flop. Operation of the two flip flops is exactly the same as previously described with certain exceptions. Since there are no more patterns to be performed (repetitive or otherwise) following this last one, it is no longer necessary to condition the tape readers to read through subsequent patterns at the end of the last two repetitions. Hence upon the repetition counter reaching the R00000 count, which indicates that there are no longer any patterns to be performed, the M–00 flip flop 37 activates the initiate deceleration circuitry 36, and at the same time causes the active reader selection means to switch to the alternate tape reader and rewind the previously active tape reader. The repetition counter initiate deceleration circuitry 36 then activates the deceleration circuitry of the machine tool so as to start slowing it down. During the slowdown and stopping period it is necessary to do something with the filamentary winding material. Hence the reason for the M–00 flip flop supplying a switching signal to the active reader selection means 20. During this slow down period, the tape readers are alternately switched into control the apparatus and then rewound to thereby dispose of the filamentary winding material by winding it over the core structure as additional windings. The alternate switching of the reading means becomes slower and slower until the machine stops at which time the dual reader stops.

From the above brief description, it can be appreciated that the invention provides a new and improved dual reader repetition control method and apparatus for performing automatic alpha-numeric control of a process or machine with machine read, prestored instruction programs which contain repetitive portions. Further it can be appreciated that the invention greatly reduces the volume of instructions required to perform the repeated automatically controlled operation with no impairment of the reliability of the control or its speed of operation. As a matter of fact because of the dual or parallel nature of the two tape readers 11 and 12, the invention is capable of faster and more accurate control of a numerically controlled process than was previously possible.

ACTIVE READER SELECTION

A brief explanation of the logic symbols used in FIGURES 4–8 will assist in the understanding of these figures.

The element represented by 52 in FIGURE 4 is commonly known in the art as a NAND gate. As denoted by the two small circues on the input, the absence of a circle on the output, and the dot in the center, the output will be a logic "1" whenever both of the inputs are logic "0." Any other combination of logic levels on the input will cause a logic zero on the input.

It should be noted, in the instant circuitry, that a logic "0" signal is represented by +6 volts and a logic "1" by zero volts (or ground potential) but these values are not instrumental in the operation of the invention which could be performed by any binary logic system.

The logic symbol shown as 56 represents an element commonly known in the art as an "or not" gate. As denoted by the absence of circles on the inputs, the circle on the output, and the plus symbol in the center, a logic "1" at either or both of the inputs will produce a logic "0" at the output.

The logic symbol shown at 51 is an element referred to in the art as a "steered" flip-flop. The flip-flop may be caused to change to a specific state, either set or reset, in one of two fashions. The first fashion is by the application of a logic "1" at input 51A (to cause it to set) or by application of a logic "1" at input 51F (to cause it to reset). The other fashion involves the use of the so-called "steering" and "trigger" terminals, denoted by the small circles on the top of the symbol for this element. In order to set the flip-flop in this fashion, a logic "0" is required at the set steering terminal 51C followed by a "trigger" on the set trigger terminal 51D. A signal is said to be a trigger when it changes from logic "1" to logic "0." Similarly, the flip-flop is reset by applying a logic "0" at the reset steering terminal 51E followed by a trigger at the reset trigger terminal 51D. When the flip-flop is set, logic "1" appears at the set output terminal 51G and a logic "0" appears at the reset output terminal 51H. If the flip-flop is reset, the signals at the output terminals are reversed.

The symbol shown at 54 represents a simple non-inverting amplifier with unity gain. That is, logic "1" on the input produces a logic "1" on the output and a logic "0" on the input produces a logic "0" on the output.

Finally, the symbol shown at 64 is a simple RC control network which operates such that when the push-button connected to it is closed its output is a logic "1." Otherwise its outputs will be a logic "0."

A further convention is employed in the identification of various control signals such as MAN, $\overline{\text{BTRA}}$, TI, etc. Where a signal such as $\overline{\text{TI}}$ is barred (that is a bar line ——— of the top of the identifying letters) this signifies that the signal is in the nature of a logical "0" if present. Where the signal, such as TI is not barred (that is there is no bar line over the top of the identifying letters), this signifies that the signal is in the nature of a logical "1" if present.

FIGURE 4 is a detailed logic circuit diagram of the active reader selection means 20 comprising a part of the overall apparatus shown in FIGURE 3 of the drawings. The active reader selection means 20 is comprised by an active tape reader flip-flop 51 of construction outlined above. From the above description, it will be appreciated that if the active tape reader flip-flop 51 is in its reset condition, it will be switched to its set condition by the application of a set signal to input terminal 51a, or the appearance of a switching signal $\overline{\text{TTIR}}$ over the conductor $C_{3837}$ applied to the input terminal 51c. The switching signal $\overline{\text{TTIR}}$ supplied over the conductor $C_{3837}$ is in fact the switching signal produced by the M–32 flip flop in FIGURE 3, and since it was assumed that flip-flop 51 was in its reset condition a steering enabling potential will be present at terminal 51b. Thus the occurrence of the switching signal $\overline{\text{TTIR}}$ from the M–32 flip flop over conductor $C_{3837}$ causes the active tape reader flip flop 51 to assume its set condition thereby producing a logic "1" output signal at its output terminal 51g. The logic "1" output signal is inverted by an inverter 53, amplified by a non-inverting amplifier 54 and supplied to one input terminal of a NAND circuit 55. NAND circuit 55 has its remaining input terminal supplied from the output of the second tape reader 12, and in accordance with the above convention is thus selected to be the active tape reader. The output from NAND circuit 55 is supplied through an OR circuit 56 which also functions as an inverting circuit and its output is supplied through a non-inverting amplifier 57 to conductor $C_{20}$ directly to form output signal $\overline{\text{TI}}$, and through an inverting circuit 58 and non-inverting amplifier 59 to the conductor $C_{15}$ to form output signal TI.

In a similar manner the reset output terminal 51h of active tape reader flip flop 51 is supplied through an inverter 61, non-inverting amplifier 62 to one input terminal of a NAND circuit 63. NAND circuit 63 has its second input terminal supplied from the output of the first tape reader 11 and its output terminal connected to a second input of the OR circuit 56. Thus it will be appreciated that the flip flop 51 selectively enables either NAND circuit 55 or 63 to gate open the output from either the first tape reader 11 or the second tape reader 12 to thereby select the active tape reader.

In order to manually select which one of the tape readers 11 or 12 will be initially activated, a push button (manually operable selector switch) 80b is provided which is connected through a control network 64 and inverter 65 to one input terminal 52b of the NAND circuit element 52. NAND circuit element 52 has its remaining input terminal 52a connected to a manual mode of operation selector switch (not shown) which supplies an enabling potential $\overline{\text{MAN}}$ that allows the second tape reader 12 to be activated manually. The first tape reader 11 similarly may be manually operated by actuation of the push button switch 80$_A$ which is connected to a source of enabling potential and through a control network 66 and inverter 67 to a NAND circuit 68 similar in construction and operation to the NAND circuit 52.

In order to indicate which of the tape readers 11 or 12 is the active tape reader to an operator of the apparatus, the output from the non-inverting amplifier 54 is connected through a second non-inverting amplifier 69 to a light bulb shown at 71 which may be blue or any other color for indicating that the tape reader 12 is the active tape reader. Similarly, the output from the non-inverting amplifier 62 is connected through a second non-inverting amplifier 72 to energize a second bulb 73 for indicating that the first tape reader 11 is the active tape reader. To properly control the tape reader rewind mechanisms 25 and 27 respectively, the conductor $C_{2025}$ is connected from the output of the non-inverting amplifier 62 back to an input of the first tape reader rewind mechanism 25 (shown in FIGURE 3), for supplying the control signal BTRA to rewind mechanism 25. The output of the non-inverting amplifier 54 similarly is connected over the conductor $C_{2027}$ to an input of the second tape reader rewind mechanism 27 (also shown in FIGURE 3) for supplying a control signal $\overline{BTRA}$ to rewind mechanism 27.

REPETITION COUNTER

FIGURE 6 of the drawings is a schematic logical diagram of one decade section of the repetition down counter 15. It should be understood that as many decades as are necessary can be added to the repetition counter shown in FIGURE 6; however, for the purpose of the present description the illustration of a single decade section is believed adequate. Also, it should be noted that while a down counter is disclosed, other types of counters could be employed in its stead without departing from the spirit of the invention. The repetition counter shown in FIGURE 6 includes a manually operable set of thumbwheel switches 34 which are coupled through OR circuits 81 and inverters 82 to the separate input counter stages of the number 1 decade counter shown, generally at 83. The decade counter 83 is conventional in construction, and will not be described in great detail. In addition to the input signal supplied thereto from inverters 82, counter 83 has a clear-counter input signal RTRS applied thereto as well as a set counter input signal $\overline{RTF1}$ for automatically clearing and setting the counter with an "R" instructions signal read from the punched tape or the like by the tape readers. In addition a count down by one trigger signal $\overline{OSC}$ is applied to counter 83 to cause it to count down by one count for each repeat of the repetitive pattern. Counter 83 also serves to develop the output signal R00000 for use with the permit "R" transfer flip flop 35 described with relation to FIGURE 3 of the drawings. In a conventional manner the decade counter 83 operates through a lamp driver 84 to illuminate a bank of lights 85 for indicating to a manual operator of the equipment the precise condition of the counter at any given instant.

REPETITION COUNTER READ IN AND TRANSFER

Figure 5:
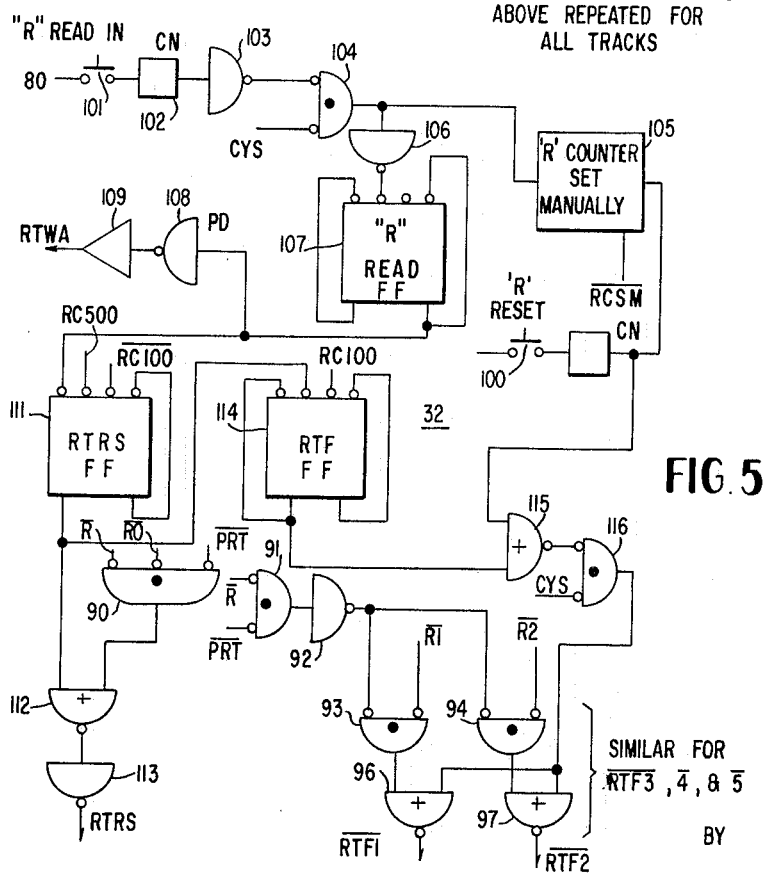
FIGURES 5 and 5a are detailed logical circuit diagrams of the repetition counter read in and transfer circuit means, and permit transfer circuit means, respectively, comprising a part of the apparatus shown in FIGURE 3.

FIGURE 5 illustrates the construction of the repetition counter read in and transfer means 32. With respect to FIGURE 5, first assume that the counter is to be set by "R" instructions recorded on the tape being read. Under these conditions, the "R" instructions are read out by a "R" recognition letter reader 31 comprising a part of the apparatus shown in FIGURE 3, and these instructions are employed to develop an $\overline{R}$ enabling potential. The existence of the $\overline{R}$ enabling potential indicates that counter setting "R" instructions are being read, and it is used to condition counter 83 to record the desired count of repetitive patterns. For this purpose a NAND gate 90 is provided which has supplied thereto as enabling potentials, the signals $\overline{R}$, $\overline{RO}$ and $\overline{PRT}$. $\overline{RO}$ is the signal produced at the instant that the tape reader reads out the recognition letter "R" at the start of the "R" instructions. $\overline{PRT}$ is an enabling poential supplied from the permit circuit means 35 of the apparatus shown in FIGURE 3. When all three enabling potentials $\overline{R}$, $\overline{RO}$ and $\overline{PRT}$ are present, a clear counter pulse RTRS is produced through OR circuit 112 and inverter 113 and supplied to counter 83 shown in FIGURE 6.

Figure 5A:
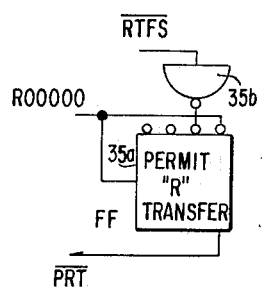

FIGURE 5A of the drawings illustrates the construction of the permit circuit means 35. The permit circuit means is comprised by a flip-flop 35a which has a R00000 signal supplied thereto from repetition down counter 15 as both a set and reset enabling potential. When the counter is empty, R00000 is logic "1" and sets flip-flop 35a to produce $\overline{PRT}$ in the form of logic "0." When the counter is filled, flip-flop 35a is reset by $\overline{RTF5}$ going to logic "1" which goes thru inverter 35b thus removing $\overline{PRT}$ and preventing any further entries into the counter until it is again emptied.

In addition to the above, the $\overline{R}$ and $\overline{PRT}$ signals are supplied to a NAND gate 91 as enabling potentials. The output from the NAND gate 91 is supplied through an inverter 92 to one input terminal of a plurality of NAND gates 93, 94, etc. and serves as one enabling potential for each of these NAND gates. NAND gates 93, 94, etc. represent the respective input NAND gates for each of the counter stages of the repetition down counter decade 83 of interest. For this reason, each of the NAND gates 93, 94 have an input signal $\overline{R1}$, $\overline{R2}$, etc. supplied to the remaining input terminal thereof which are representative of the first, second, etc. digits in the "R" instructions representative of the count to be recorded in the repetition down counter. The outputs from the NAND gates 93, 94, etc. are therefore supplied through respective OR gates 96, 97, etc. to the input of the repetition down counter as the signals $\overline{RTF1}$, $\overline{RTF2}$, etc. From a consideration of FIGURE 6 of the drawings, it will be appreciated that the signals $\overline{RTF1}$, $\overline{RTF2}$, etc. serve to set the down counter to the desired number of repetitions of the pattern in question.

The above described rather straight forward circuitry functions to achieve automatic read in of the desired count into the repetition down counter. If it is desired to manually set the down counter, then it is first necessary to set the manually operable thumbwheel 34 to the desired count in the counter. After thus setting the thumbwheels, the "R" read in push button shown at 101 in FIGURE 5 is depressed. This activates a control network 102 which supplies an output enabling potential through an inverter 103 to an input terminal of a NAND circuit 104. NAND circuit 104 also has supplied thereto an enabling potential CYS which serves as an inhibit signal to prevent inserting a manual count into the repetition down counter after a counting cycle has been commenced. The output signal from the NAND gate 104 is supplied through an inverter 106 to a "R" Read flip flop 107. "R" Read flip flop 107 in turn provides an enabling potential back through an inverter 108 and non-inverting amplifier 109 to the thumbwheel switches 34 to thereby activate the thumbwheel switches. In addition this enabling potential is applied to an input terminal of a RTRS flip-flop 111 whose pulsed output is supplied through an OR gate 112 and inverter 113 as the clearing signal RTRS supplied to the repetition down counter 83 shown in FIGURE 6. Flip flop 111 also supplies an enabling potential to an RTF flip flop 114 which is set when RTRS flip flop 111 resets and is subsequently reset by input clock pulse RC100 switched from its set to its reset condition by an input clock pulse signal RC100 at the termination of the clearing pulse produced by RTRS flip-flop 111.

FIGURE 8 of the drawings illustrates a series of voltage versus time characteristic curves illustrating the nature of the clock signals, the $\overline{R}$ enabling signal, and the signals put out by the RTF and RTRS flip flops 114 and 111. The voltage wave shape RC500 is a basic clock pulse signal produced auxiliary circuitry (not shown) and is stepped up in frequency to produce a second clock pulse signal $\overline{RC100}$. Both $\overline{RC100}$ and its inverted form illustrated as a non barred RC100, are utilized. The RC500 and the $\overline{RC100}$ signals are supplied to the RTRS flip flop 111 as enabling potential for synchronization purposes. From a consideration of FIGURE 8 it will be seen that upon depression of the push button switch 101 to read in the count previously set in the mechanically operable thumbwheel switches 34, the "R" Read PB signal shown in FIGURE 8 will be produced. As previously indicated this results in the production of the RTWA signal at the output of amplifier 109 in FIGURE 5 that is supplied back to the repetition counter to activate the thumbwheel switches. Thereafter at the next RC500 clock pulse RTRS flip flop 111 produces the clearing signal RTRS that serves to clear the counter of any previous count and condition it to read out the thumbwheel switches. Subsequently RTRS flip flop 111 upon being reset by RC100 supplies an enabling potential to the RTF flip flop 114 which then is switched from its reset to its set condition by the input RC100 clock pulse signal. Switching of the RTF flip flop 114 produces a counter setting signal pulse RTF that is supplied through an OR gate 115 and a NAND circuit 116 to the input of all the OR gates 96 and 97, etc. This results in the production of the signals $\overline{RTF1}$, $\overline{RTF2}$, etc. which reset all sections of the repetition down counter except those which have been selected by the "R" thumb wheel switches. Upon the counter being filled, signal $\overline{RTF5}$ goes to logic "1," resets the permit "R" transfer flip flop, and prohibits any subsequent tape address of "R" into the counter until the R00000 signal goes to the logic "1" value. If operation of the dual reader apparatus has been interrupted to thus manually reset the count in the repetition counter, all that is then required is to depress the cycle start push button (not shown) and the required number of repetitions manually set into the repetition down counter are then executed in the above described fashion. When thus manually set, the last repetition will be treated as if it were the last repetition occurring in the pattern. Hence, the tape readers which previously have been rewound and transferred after each repeat, will recognize the R00000 signal and will initiate the deceleration flip flop 36 in the above described manner to condition the apparatus to come to a halt.

In order to condition the initiate deceleration flip flop 36 to function in the above-described manner, the output from NAND gate 104 is also supplied to the set input terminal of an "R" counter set manually flip-flop 105. This flip flop upon being set by manual operation of the counter, develops a $\overline{RCSM}$ enabling potential at its reset output terminal which is used in the manner to be described hereinafter with relation to FIGURE 7 of the drawings. It should also be noted that if it is desired to manually reset the counter, the counter can be cleared by depressing an "R" Reset push button switch 100. This applies a clearing potential through a control network, OR gate 115, NAND gate 116 and all of the OR gates 96, 97, etc. to clear the counter. Depression of "R" Reset switch also serves to reset the "R" Counter Set Manually flip flop 105.

TAPE READER REWIND CONTROL

Figure 7:
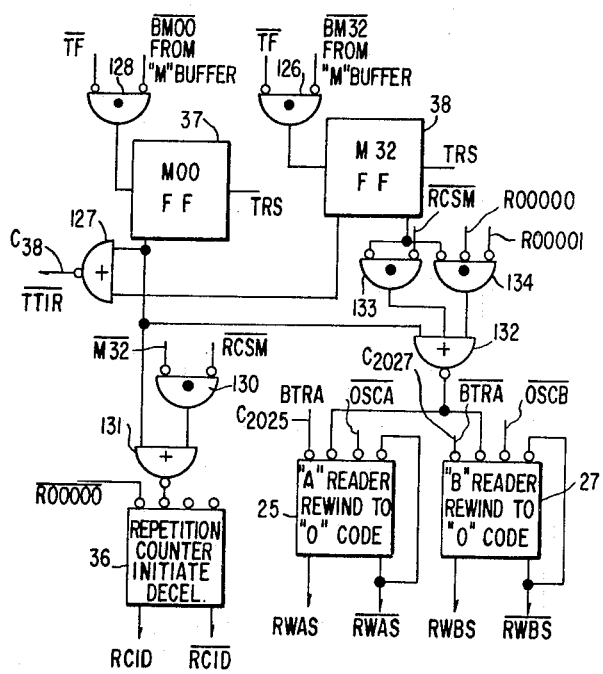
FIGURES 7, 7a, 7b and 7c are detailed logical circuit diagrams of portions of the tape reader rewind control comprising a part of the apparatus shown in FIGURE 3.

FIGURE 7 is a logical circuit diagram of the tape reader re-wind control portions of the apparatus shown in FIGURE 3. Referring to FIGURE 7, the first tape reader rewind to "0" code flip-flop is shown at 25 and serves to control rewind of the first tape reader 11. The second reader rewind to "0" code flip-flop 26 similarly serves to control rewind of the second tape reader 12. The output signals from each of the reader rewind to 0 code flip flops 25 and 26 are connected to control the rewind mechanism of the respective tape readers 11 and 12. The input to the first tape rewind to "0" code flip-flop 25 includes an input signal BTRA conducted over conductor $C_{2025}$ which comprises a steering signal to assure that the appropriate reader is rewound. A second input terminal of flip-flop 25 has a signal marked $\overline{OSCA}$ supplied thereto which is obtained from the circuitry shown in FIGURE 7A of the drawing, to stop the rewind when the "0" stop code is reached.

Figure 7C:
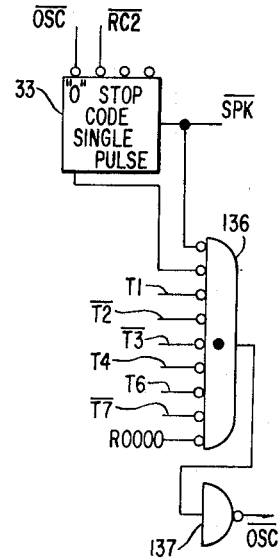
Figure 7A:
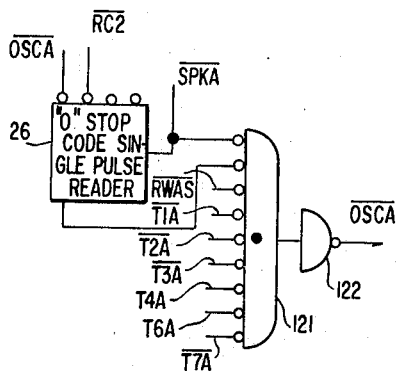

FIGURE 7A of the drawings illustrates the construction of the "0" stop code single pulse reader 26 as comprising a flip-flop having its output supplied to one input terminal of a NAND gate 121. The outputs from the various tracks of first tape reader T1A, T2A, etc. are supplied to the remaining input terminals of NAND gate 121 along with a sprocket $\overline{5PKA}$ signal. NAND gate 121 has its output coupled to an inverter 122 which develops the output signal $\overline{OSCA}$ that is applied to one of the input terminals of the flip-flop 25 as an enabling potential. As a result of this arrangement the "0" stop code signal pulse reader 26 will recognize the "0" stop code during rewind of the first tape reader while it is the inactive reader, and will stop the rewind at a point just prior to the commencement of the repetitive pattern as described above. To accomplish this, the "0" stop code single pulse reader 26 in conjunction with NAND gate 121 develops the $\overline{OSCA}$ signal supplied to the first reader rewind flip-flop 25 to cause this flip-flop to de-energize the rewind mechanism of the first tape reader.

Figure 7B:
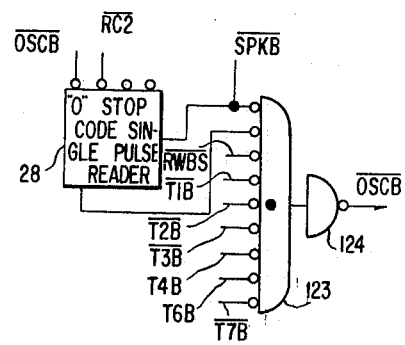

In a similar manner, the second tape reader rewind to "0" code flip-flop 27 supplies its output signals RNBS and $\overline{RNBS}$ to control rewind of the second tape reader. One of the input signals supplied to the input of the flip-flop 27 is the $\overline{BTRA}$ signal supplied over conductor $C_{2027}$ from the active reader selection means. This signal serves as a steering signal to assure that the appropriate reader is rewound. In addition to these signals, an $\overline{OSCB}$ signal is supplied to an input of the second tape reader rewind to "0" code flip-flop 27 from the circuitry shown in FIGURE 7B. FIGURE 7B illustrates the construction of the "0" stop code single pulse reader used by the second tape reader and comprises a flip-flop 28. Flip-flop 28 has its output terminal supplied to a NAND gate 123 whose output is supplied through an inverter 124 to develop the inhibit signal $\overline{OSCB}$ in the same manner as FIGURE 7A. As a result of this arrangement, during rewind of the second tape reader, the "0" stop code single pulse reader 28 operates to recognize the "O" stop code, and to stop rewind of the second tape reader at this point thereby conditioning it to start a reread cycle of the repetitive portion of the prestored program.

FIGURE 7c of the drawings illustrates the construction of the "0" stop code single pulse circuit means 33 for causing the repetition down counter 15 to count down one count at the commencement of each repetition pattern. The "0" stop code single pulse circuit means 33 is comprised by a flip-flop 33 having its output connected to one input terminal of a NAND gate 136 along with the output signals from the several tracks T1, T2, etc. of the active tape reader and the sprocket signal $\overline{SPK}$. NAND gate 136 has its output supplied through an inverter 137 to provide the desired $\overline{O5C}$ signal for counting down the repetition down counter 15.

Referring again to FIGURE 7 of the drawings, the M-32 flip-flop 38 has its set input connected to the output from a NAND gate 126. NAND gate 126 has its input supplied from the buffer memory 21 (indicated in FIGURE 3) and from a source of enabling potential $\overline{TF}$, and serves to develop an output signal $\overline{TTIR}$ supplied across conductor $C_{38}$ for switching the active reader selection circuit means 20 from one reader to the other. The potential appearing across conductor $C_{38}$ is supplied through an OR gate 127 which has a second input terminal connected to the output from the M–00 flip-flop 37 for supplying a reader switching signal from the M–00 flip flop to the input of the active reader selection circuit 20.

The M-00 flip-flop 37 has its input supplied from the buffer memory through a NAND gate 128. The output from the M-00 flip flop 37 is supplied through the OR gate 127 back to the active reader selection circuit means 20 over conductor $C_{38}$, and is also supplied through an OR gate 131 to the input of the repetition counter initiate deceleration circuit 36 to initiate deceleration of the machine tool or other apparatus being controlled by the dual reader control. OR gate 131 also has supplied thereto the output from a NAND gate 130 which is enabled by the M-32 signal from M-32 flip flop 38 and by the $\overline{\text{RCSM}}$ signal from "R" Counter Set Manually flip flop 105. This will initiate deceleration at the end of a manually set repetitive pattern.

The output potential from the M-00 flip flop 47 is also supplied through an OR gate 132 to an input terminal of the rewind flip-flops 25 and 26. As a consequence, the rewind flip-flops will be enabled to continue rewinding the tape reader mechanisms which they control, hence conditioning the apparatus to continue to read out the repetitive portions of the prestored program upon actuation of the M-00 flip flop 37. Thus the rewind flip-flops 25 and 26 will continue to operate during deceleration of the machine tool or other apparatus as described above.

In addition to the above mentioned connection to M-00 flip flop 37, the OR gate 132 has two input terminals supplied from the output of a pair of NAND gates 133 and 134, respectively. NAND gate 133 has one of its input terminals supplied from the output of the M-32 flip-flop 38, and has a second input terminal supplied with an enabling potential $\overline{\text{RCSM}}$ developed by "R" counter set manually flip-flop 105 in FIGURE 5. As a consequence of this connection, at the end of each reading of the repetitive portion of the pattern after manual setting of counter 15, NAND gate 133 will supply an enabling potential through OR gate 132 to either of the rewind to "0" code flip-flops 25 or 26 whichever one is conditioned to rewind its associated tape reader.

When the last two repetitions are read (one by each of the readers) the tape readers must be prepared to advance into further, subsequent patterns. This is accomplished with the NAND circuit 134 which has supplied thereto enabling potentials from the M-32 flip flop and the R000001 and R00000 stages of the counter. By this arrangement during most of the operation, each time the M-32 flip flop is set at the end of a repetitive pattern, NAND gate 134 will supply enabling signals to either of the first and second reader rewind to "0" code flip-flops 25 and 27. However, during the last two repetitions it serves to block further operation of flip-flops 25 and 27. Assume that the first tape reader 11 begins the next to last repetition and that it reads through the "0" stop code and counts the repetition down counter down to the R000001 count. When the M-32 code is read in the last block, the switching signal $\overline{\text{TTIR}}$ coupled across conductor $C_{38}$ transfers control to the second tape reader 12 but the first tape reader 11 does not rewind since the trigger to the first reader rewind "0" code flip-flop 25 is blocked by the presence of the R000001 logical "1" signal applied to NAND gate 134. Thus the first tape reader 11 will remain at the end of the pattern. When the second tape reader 12 finishes the final repetition it will transfer control back to the first tape reader 11 which then advances and commences to read out the remainder of the patterns. Since the rewind to "0" code flip-flops 25 and 26 are blocked from being triggered by the presence of R00000 logical "1" signal applied to NAND gate 134, the second tape reader 26 likewise does not rewind and hence also is in position to read out the remainder of the patterns.

From the foregoing description it can be appreciated that the invention provides a new and improved dual reader repetition control method and apparatus for performing automatic alpha-numeric control of a process or machine with machine read, prestored instruction programs which obtain repetitive portions, and does so while greatly reducing the volume of instructional material required to perform the repeated automatically controlled operation. This is achieved without any reduction in the reliability or speed of the control and in fact enhances the performance of an automatic machine tool or other apparatus employing the control.

Having described one embodiment of a dual reader repetition control method and apparatus in accordance with the invention, it is believed obvious that other modifications and variations of the invention are possible in light of the above teachings. It is therefore to be understood that changes may be made in the particular embodiment of the invention described which are within the full intended scope of the invention as defined by the appended claims.

We claim:

1. In a prestored program alpha-numerically controlled apparatus for performing repetitive operations the improvement comprising at least two program reading means each having a copy of at least the repetitive portion of the prestored program of operations to be conducted for sensing the same and deriving an output control signal, active reader selection means operatively coupled to said reading means and to the alpha-numerically controlled apparatus for alternately selecting and rendering active one of the reading means and for supplying the output of the active reading means to control the apparatus, rewind means operatively coupled to each of the reading means and to the active reader selection means and controlled thereby for automatically returning the active reading to the start of the repetitive portion of the prestored program upon reaching the end thereof, and means for automatically switching said active reader selection means to the alternate reading means to render it active upon the previously active reading means reaching the end of the repetitive portion of the operation and to initiate rewind means.

2. An apparatus according to claim 1 wherein said means for automatically switching said active reader selection means includes finish repeat recognition means for recognizing an end of repetitive operation code in the prestored program operatively coupled to the output from the active reading means and to the active reader selection means for actuating the active reader selection means at the end of each repetitive operation to cause it to select the alternate one of the reading means and render it active and to initiate rewind of the previously active reading means.

3. An apparatus according to claim 2 further including means for inactivating the rewind means upon completion of a desired number of repetitive portions of the prestored program.

4. An apparatus according to claim 2 further including counting means, means for presetting said counting means at the start of the prestored program to a desired number of repetitive operations to be conducted, and means controlled by said counting means for inactivating said rewind means upon completion of the desired number of repetitive operations whereby at least one of the reading means is conditioned to complete the remainder of the prestored program.

5. An apparatus according to claim 4 further including start of repetitive pattern recognition means for recognizing a start of repetitive operation code with the prestored program operatively coupled to the reading means and to the counting means for adjusting the counts in said counting means during each repetitive operation.

6. An apparatus according to claim 5 further including counter read-in and transfer means operatively coupled to the counting means and to the output from the reading means for automatically presetting the counting means to a desired number of repetitive operations.

7. An apparatus according to claim 6 further including preset count instruction recognition means operatively coupled to the output from said reading means and to an input of said counter read-in and transfer means for identifying the preset count instructions in the prestored program and operating the counter read-in and transfer means in accordance therewith.

8. An apparatus according to claim 7 further including instruction read-in permit means operatively coupled to said counting means and to said counter read-in and transfer means for permitting transfer of new instruction to said counting means only when the counting means is empty and inhibiting such transfer under all other conditions.

9. An apparatus according to claim 2 wherein said rewind means comprises rewind means for each of the reading means and further includes respective means for recognizing a start of repetitive operation code in the prestored program coupled to the output of the respective reading means and to their respective rewind means for stopping the rewind means for the inactive reading means during rewind thereof at the start of the repetitive portion of the prestored program.

10. An apparatus according to claim 8 wherein said rewind means comprises rewind means for each of the reading means and further includes respective means for recognizing a start of repetitive operation code in the prestored program coupled to the output of the respective reading means and to their respective rewind means for stopping the rewind means of the inactive reading means during rewind thereof at the start of the repetitive portion of the prestored program.

11. An apparatus according to claim 10 further including means of recognizing the end of the repetitive operations portion of the prestored program operatively coupled to the outputs of the reading means and the counting means and coupled to the inputs of the active reader selection means and to the alpha-numerically controlled apparatus for concurrently switching the active reading means and conditioning the apparatus to perform the remainder of the prestored program.

12. An apparatus according to claim 10 further including a manually operable means operatively coupled to said counting means for manually presetting the counting means.

13. An apparatus according to claim 12 further including respective manually operable switching means connected to each of said reading means for manually selecting the active reading means.

14. The method of controlling a prestored program run alpha-numeric controlled process with prestored programs having a portion to be repeated and a remainder portion and using at least two prestored program reading means each capable of reading similar copies of at least the repetitive portion of the prestored programs comprising alternately causing one and then the other of said program reading means to be the active program reader to read a respective repetitive portion and control the process in accordance with a respective output thereof and then become an inactive program reader, returning each inactive program reader to the start of its associated repetitive portion, and discontinuing the return of the alternate inactive reading means to the start of the repetitive portion of the prestored program upon completion of a predirected number of repeats whereby the reading means are conditioned to complete the remainder portion of the prestored program.

15. Apparatus for executing a sequence of operations wherein a number of the operations are to be repeated comprising:
(a) a source of first signals representing the desired number of times an operation is to be repeated,
(b) a source of second signals representing the nature of an operation and where operations to be repeated are represented by second signals available in the form of duplicate copies,
(c) means responsive to said first signal for alternately sensing said duplicate copies to provide third signals representing the nature of repeated operations,
(d) means responsive to said third signals to repeatedly execute the operation,
(e) means responsive to the repeated execution of each operation to provide fourth signals,
(f) means responsive to said fourth signals and to said first signals for controlling whether the operation is to be further repeated and means responsive to a fourth signal indicating commencement of the execution of the next to the last one of said desired number of repeated operations and to said first signal to cause an operation other than said repeated operations to be executed.

16. Apparatus for executing a sequence of operations wherein identical tape instructions include a stop code, the desired number of repetitions N of a pattern addressed by an address R and the blocks of data representing the pattern itself, first and second reader means, a repetition counter, means for activating one of said readers to read the R address, to read the desired number of repetitions N into a repetition counter, and to read all the blocks of data on one of said tape instructions constituting said pattern, means responsive to the last block of data to activate the other reader to read all the blocks of data on the other of said tapes constituting said pattern, and to rewind said first reader to its associated stop code, means for causing said readers to alternate in this fashion, repeating the desired pattern and counting down the repetition counter every time a stop code is read, means responsive to the repetition counter indicating one repetition remaining to prevent rewinding the active tape reader, and means responsive to the repetition counter indicating that the desired number of repetitions have been completed to activate said last mentioned reader to continue with a new pattern and prevent the rewind of the reader that was last active.

References Cited

UNITED STATES PATENTS

| | | | |
|---|---|---|---|
| 2,369,430 | 2/1945 | Brand et al. | 235—61.602 |
| 2,615,629 | 10/1952 | Dayger et al. | 235—61.602 |
| 2,905,299 | 9/1959 | Hildebrandt | 197—20 |
| 3,025,941 | 3/1962 | Blodgett et al. | 197—20 |
| 3,234,363 | 2/1966 | Garth et al. | 235—61.6 |
| 3,267,251 | 8/1966 | Anderson. | |
| 3,297,929 | 1/1967 | Gardner. | |

DARYL W. COOK, Primary Examiner

R. M. KILGORE, Assistant Examiner

U.S. Cl. X.R.

197—20; 235—61.11

UNITED STATES PATENT OFFICE
CERTIFICATE OF CORRECTION

Patent No. 3,486,005                                December 23, 1969

Donald Lyle Logerwell et al.

It is certified that error appears in the above identified patent and that said Letters Patent are hereby corrected as shown below:

Column 2, line 37, "prevoiusly" should read -- previously -- Column 3, line 11, "," should read -- ; --. Column 4, line 48, "he" should read -- the --. Column 9, line 14, "into" should read -- in to --; line 41, "circues" should read -- circles --. Column 10, line 8, "outputs" should read -- output --; line 38, "The" should read -- This --. Column 11, line 74, "poential" should read -- potential --. Column 12, line 74, "produced" should read -- produced by --. Column 14, line 12, "SPKA" should read -- SPKA --; line 59, "O5C" should read -- OSC --. Column 15, line 75, "obtain" should read -- contain --. Column 16, line 31, after "reading" insert -- means --. Column 18, after line 46, insert 17. The method of executing a sequence of operations wherein a number of operations in the sequence are to be repeated using alternately active sensing means each capable of sensing similar copies of at least the repetitive portions of the operations comprising the steps of:

(a) providing an indication of the desired number of times an operation is to be repeated;

(b) providing an indication of the nature of the repeated operation;

(c) recording the indication of the desired number;

(d) sensing the indication of the nature of the operation to be repeated with the active sensing means and executing it: and (e) recording the execution of the operation to be repeated then using this recordation in conjunction with the desired number to determine whether the operation is to be repeated by rendering the alternate
sensing means active or whether another
operation is to commence.

In the heading to the printed specification, line 9, "16 Claims"
should read -- 17 Claims --.

Signed and sealed this 23rd day of March 1971.

(SEAL)
Attest:

EDWARD M.FLETCHER,JR.                    WILLIAM E. SCHUYLER, JR
Attesting Officer                        Commissioner of Patents